(12) United States Patent
Iimura

(10) Patent No.: US 9,052,532 B2
(45) Date of Patent: Jun. 9, 2015

(54) EYEGLASS FRAME

(71) Applicant: Four Nines Co., Ltd., Tokyo (JP)

(72) Inventor: Yuichi Iimura, Tokyo (JP)

(73) Assignee: Four Nines Co., Ltd., Tokyo (JP)

( * ) Notice: Subject to any disclaimer, the term of this patent is extended or adjusted under 35 U.S.C. 154(b) by 96 days.

(21) Appl. No.: 13/792,615

(22) Filed: Mar. 11, 2013

(65) Prior Publication Data

US 2014/0253863 A1 Sep. 11, 2014

(51) Int. Cl.
| | |
|---|---|
| G02C 1/00 | (2006.01) |
| G02C 5/22 | (2006.01) |
| G02C 1/06 | (2006.01) |
| G02C 5/00 | (2006.01) |
| G02C 5/02 | (2006.01) |
| G02C 5/10 | (2006.01) |

(52) U.S. Cl.
CPC ............. *G02C 5/2218* (2013.01); *G02C 1/00* (2013.01); *G02C 1/06* (2013.01); *G02C 5/001* (2013.01); *G02C 5/02* (2013.01); *G02C 5/10* (2013.01)

(58) Field of Classification Search
CPC .............. G02C 1/00; G02C 1/04; G02C 1/06; G02C 5/008; G02C 5/146; G02C 5/16
USPC .......................... 351/47, 57, 83, 89, 103–109
See application file for complete search history.

(56) References Cited

U.S. PATENT DOCUMENTS

| | | | | |
|---|---|---|---|---|
| 3,453,042 | A * | 7/1969 | Cooper | 351/86 |
| 6,474,810 | B1 * | 11/2002 | Ng | 351/47 |
| 6,592,220 | B1 | 7/2003 | Cheong | |
| 6,921,166 | B2 * | 7/2005 | Xiao | 351/47 |
| 7,722,188 | B2 | 5/2010 | Mikame | |
| 8,042,937 | B2 | 10/2011 | Iimura | |
| 2002/0057415 | A1 | 5/2002 | Xiao | |

FOREIGN PATENT DOCUMENTS

| | | | |
|---|---|---|---|
| DE | 94 13 073 | 10/1994 | |
| EP | 0992830 A1 * | 4/2000 | ............ G02C 3/00 |
| EP | 2 107 415 | 10/2009 | |
| EP | 2 302 440 | 3/2011 | |
| FR | 59 177 | 5/1954 | |
| FR | 2 544 087 | 10/1984 | |
| GB | 1050017 | 12/1966 | |
| GB | 2485174 | 5/2012 | |
| JP | 2003-228027 | 8/2003 | |
| JP | 2007-156302 | 6/2007 | |

(Continued)

OTHER PUBLICATIONS

European Search Report (ESR) issued Jul. 2, 2013 in corresponding European Patent Application No. EP 13 15 8662.

(Continued)

*Primary Examiner* — Huy K Mai
(74) *Attorney, Agent, or Firm* — Wenderoth, Lind & Ponack, L.L.P.

(57) ABSTRACT

An eyeglass frame includes an outer frame, an inner frame provided with a pair of eyeglass lenses, and temples connected to the outer frame. The inner frame is attached to the outer frame. The outer frame includes opening portions corresponding to the eyeglass lenses attached to the inner frame.

13 Claims, 6 Drawing Sheets

(56) References Cited

FOREIGN PATENT DOCUMENTS

| | | |
|---|---|---|
| JP | 2007-206360 | 8/2007 |
| JP | 2008-76743 | 4/2008 |
| JP | 2012-123408 | 6/2012 |
| JP | 2012-133198 | 7/2012 |
| WO | 03/040809 | 5/2003 |

OTHER PUBLICATIONS

European Search Report issued Jul. 2, 2013 in corresponding European Patent Application No. EP 13 15 8644.8.

European Search Report (ESR) issued Jul. 2, 2013 in corresponding European Patent Application No. EP 13 15 8644.8.

* cited by examiner

EYEGLASS FRAME

BACKGROUND OF THE INVENTION

1. Field of the Invention

The present invention relates to an eyeglass frame to hold eyeglass lenses, more specifically, to an eyeglass frame in which deformation or breaking of the eyeglass lenses is not generated even if temples of the eyeglass frame are opened widely.

2. Description of the Related Art

Generally, an eyeglass frame includes a front frame to hold right and left eyeglass lenses, and temples each being connected to a corresponding one of opposite ends of the front frame through a hinge. In such a front frame, there is a full rim type (for holding each lens by a rim extending around the entirety of the lens), and a rimless type called a half rim type or two points (for holding a part of each lens by a rim and another part of each lens by a screw, wire or string).

When a user typically uses the eyeglass frame, the temples are in a maximum open state or position relative to the front frame. On the other hand, when an eyeglass frame is fitted to the user, an open degree of each hinge connecting the front frame and the respective temple, or a bending degree of each of the temples is adjusted such that the temples do not impart a large force to a head of the user, and the temples are fitted to the head.

However, when the user mounts the eyeglasses on his or her head, or removes them from his or her head, the user tends to open the temples unconsciously and more widely than the maximum open state. Therefore, if the eyeglass frame is used for a long period, the temples become outwardly bent and gradually reach a state in which they do not fit the head, and hence it is difficult to use the eyeglasses. In addition, a large force is sometimes transmitted to the front frame due to an excessive opening of the temples. Consequently, breaking of the front frame, and further breaking of the eyeglass lenses are generated.

As shown in FIG. 6, there is disclosed a conventional eyeglass frame 110 in which, even if temples are opened widely, a force is not imparted to a front frame or eyeglass lenses (for reference, see JP2008-76743A). The eyeglass frame 110 has a generally L-character like shape and includes a pair of right and left lens stays 122 each holding an inner side portion of an eyeglass lens 160, a bridge 123 connecting the pair of lens stays 122, a connection arm 124 connected to each of the lens stays 122, and a temple 131 connected to each of the connection arms 124 through a hinge 130 to be rotatable inwardly and outwardly. Meanwhile, lens stoppers 162 to hold the eyeglass lenses 160 are provided on the lens stays 122.

Here, each of the eyeglass lenses 160 is attached to a corresponding one of the lens stays 122 at one point. Therefore, even if the temples 131 are opened widely, a force is not imparted to the eyeglass lenses 160. In addition, because the temples 131 and the connection arms 124 have elasticity, even if the temples are repeatedly opened widely, the opening operation or movement can be absorbed by the elasticity of the temples 131 and the connection arms 124, and has no effect on the lenses 160. Meanwhile, a nose pad 161 may be attached to each of the lens stays 122.

However, the structure of the conventional eyeglass frame cannot be applied to a full rim-type front frame made of a resin, because a design and a structure of eyeglasses are limited. Accordingly, it is desired that, even if a wide opening of the temples is repeated, a function having no effect on eyeglass lenses can be applied widely to eyeglasses having other design or structure.

SUMMARY OF THE INVENTION

An object of the present invention is to provide an eyeglass frame in which a force is not imparted to a front frame or eyeglass lenses even if the temples are opened widely, and which has a new design and applicable to any type of eyeglasses.

To accomplish the foregoing object, an eyeglass frame according to an embodiment of the present invention includes an outer frame, an inner frame disposed at an inner side of the outer frame and attached to the outer frame, and temples each attached to the outer frame to be rotatable between an inwardly folded position and an outwardly opened position, relative to the outer frame. Right and left eyeglass lenses are attached to the inner frame. The outer frame includes right and left opening portions disposed to correspond to the right and left eyeglass lenses attached to the inner frame.

DETAILED DESCRIPTION OF THE PREFERRED EMBODIMENTS

Figure 1:
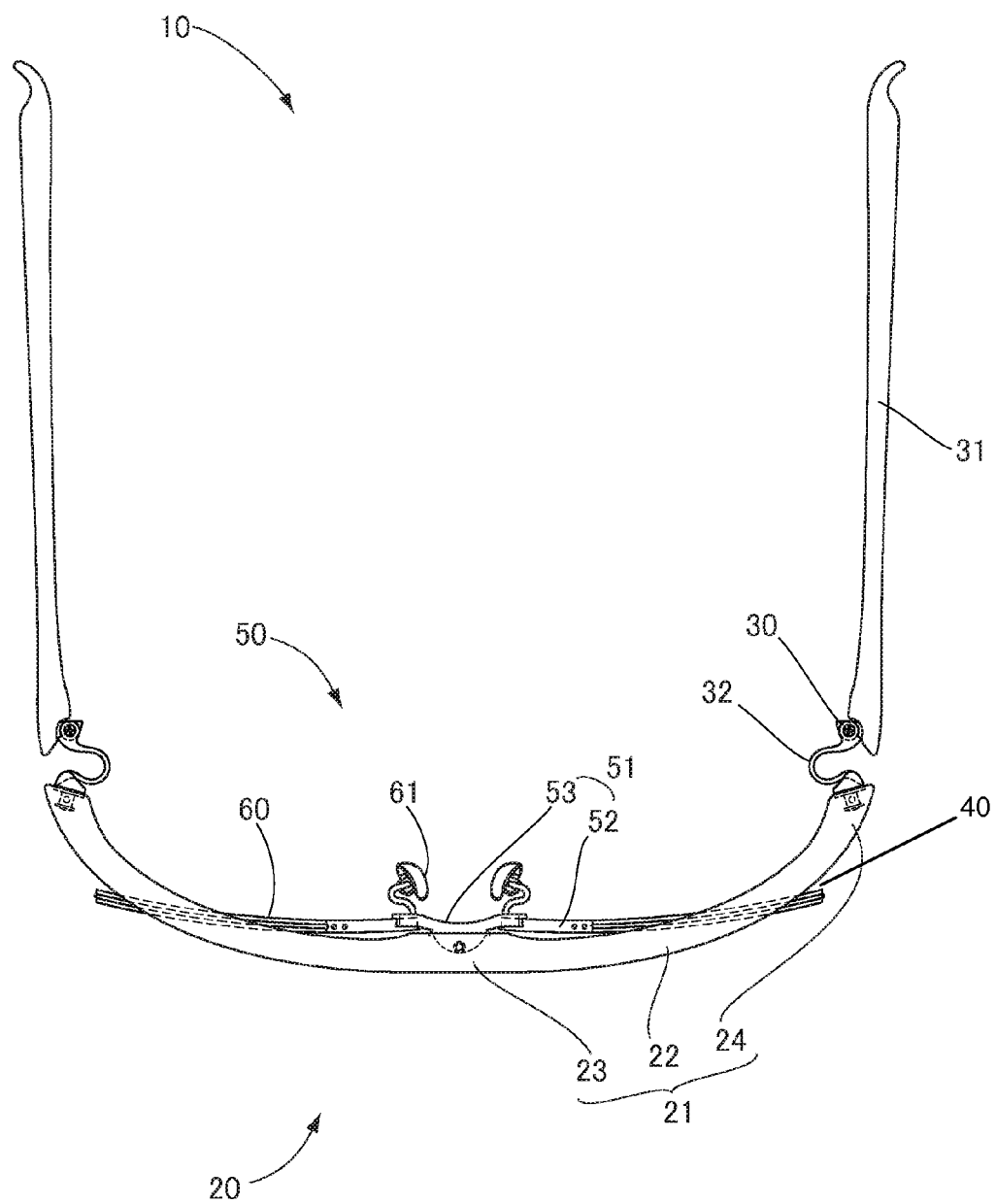
FIG. 1 is a schematic plan view of an eyeglass frame according to one embodiment of the present invention.
Figure 2:
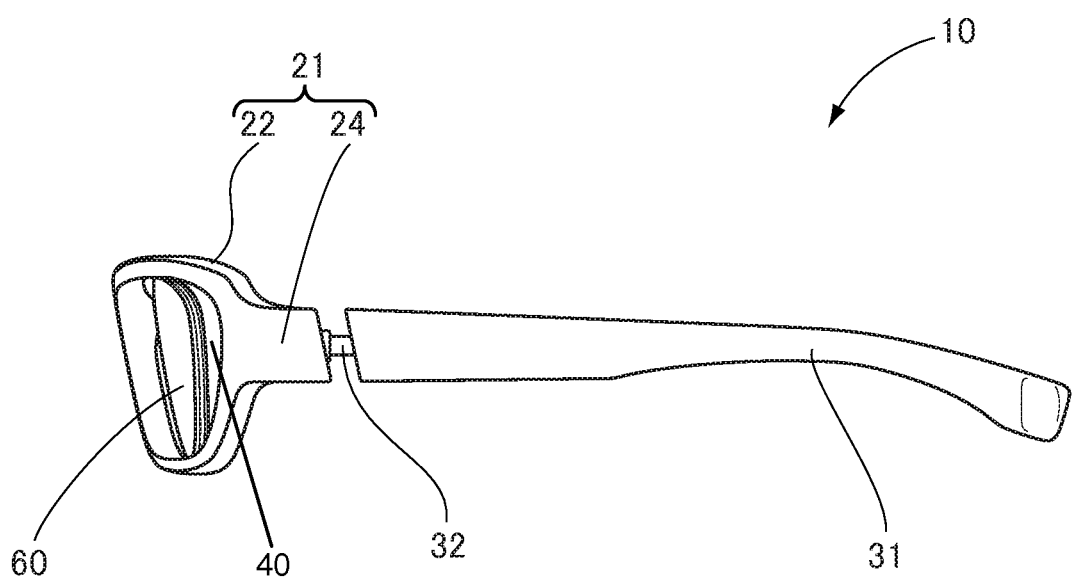
FIG. 2 is a schematic side view of the eyeglass frame shown in FIG. 1.

Preferred embodiments of the present invention will be explained hereinafter in detail with reference to the accompanying drawings.

FIGS. 1 to 5 illustrate an eyeglass frame 10 according to an embodiment of the present invention. The eyeglass frame 10 includes an outer frame 20, an inner frame 50 disposed at an inner side of the outer frame 20 and attached to the outer frame 20, and temples 31 each being attached to a corresponding one of opposite ends of the outer frame 20 (see FIG. 1).

The outer frame 20 includes an outer front frame 21 and connection arms 24 extending backward from opposite ends of the outer frame 20. The inner frame 50 includes an inner front frame 51. Right and left eyeglass lenses 60 are attached to the inner front frame 51 (see FIG. 4). The outer front frame 21 includes right and left opening portions 40 provided to face the right and left eyeglass lenses 60 attached to the inner frame 50 (see FIGS. 1 and 2).

Figure 3:
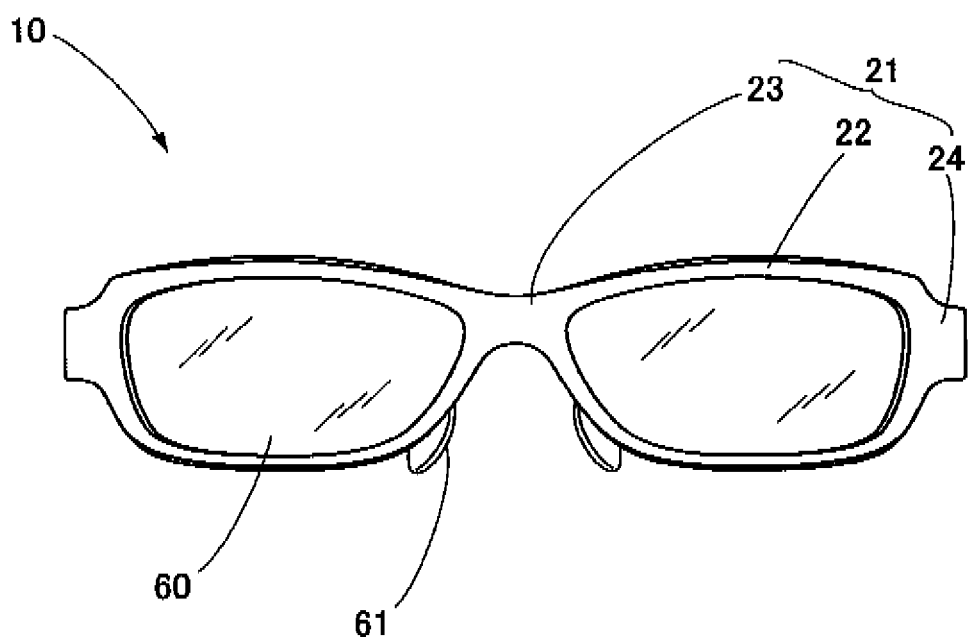
FIG. 3 is a schematic front view of the eyeglass frame shown in FIG. 1.

The outer front frame 21 includes right and left outer rims 22 and an outer bridge 23 connecting the outer rims 22, as shown in FIG. 3. Each of the connection arms 24 extends from the end of a corresponding one of the right and left outer rims 22. The inner front frame 51 includes right and left inner rims 52 to hold the right and left eyeglass lenses 60, respectively, and an inner bridge 53 connecting the right and left inner rims 52. The right and left opening portions 40 are formed by the right and left outer rims 22, in the illustrated embodiment. In other words, the opening portions 40 are surrounded by the outer rims 22. A shape of the opening portions is formed depending on a shape of the eyeglass lenses 60. Consequently, if the eyeglass frame is used, a user can view an object through the eyeglass lenses 60 of the inner frame 50 and the opening portions 40 of the outer frame 20.

Each of the temples 31 is connected to a corresponding one of the connection arms 24 of the outer frame 20 through, for example, a hinge 30 rotatable inward and outward. Thereby, the pair of temples 31 is capable of opening outward and of folding inward relative to the outer frame 20.

The outer front frame 21 is made of, for example, a resin. The temples 31 are made of, for example, a resin, but may be made of a metal. In the illustrated embodiment, the outer front frame 21 is a full rim type, but may be a half rim type.

The hinges 30 rotatably mount the temples 31, respectively, on the outer front frame 21 and are configured to limit a rotating range of the temples 31 to a maximum open state. In other words, when the eyeglass frame 10 are in use, the hinges 30 are configured to limit the temples 31 such that the temples cannot be rotated past the maximum open state. When the eyeglass frame is not in use, the hinges 30 are configured to be capable of folding the temples 31 inwardly to contain them in a case (not shown).

In the foregoing embodiment, the temples 31 are connected to the outer frame 20 through the hinges 30, respectively, but may be connected to the outer frame 20 through elastic parts 32 respectively disposed adjacent to the hinges 30 in addition to the hinges 30, as a modified example. Here, each of the elastic parts 32 can be provided on a part of the connection arm 24, a part of a corresponding one of the temples 31, or a part of a corresponding one of the hinges 30. In the illustrated embodiment, each of the elastic parts 32 has a generally U-character like shape and is connected at one end thereof to a corresponding one of the connection arms 24 and at the other end thereof to the corresponding one of the temples 31 through the corresponding one of the hinges 30. Meanwhile, each of the elastic parts 32 is not limited to the U-character like shape, but may be formed in an S-character like shape. Each of the elastic parts 32 has an appropriate elasticity such that an impact force generated by opening and closing operation of the corresponding one of the temples 31 is not transmitted to the outer front frame 21, even if one of the temples 31 is hastily opened or folded (closed).

Each of the elastic parts 32 is preferably deformable resiliently at an angle equal to 10 degrees or more. Thereby, when a user mounts the eyeglass frame 10 on his or her head or removes it from his or her head, it is possible to further open the temples 31 past the maximum open state by about 10 degrees or more at one side. Consequently, it is possible to prevent the eyeglass lenses 60 from being broken.

Figure 4:
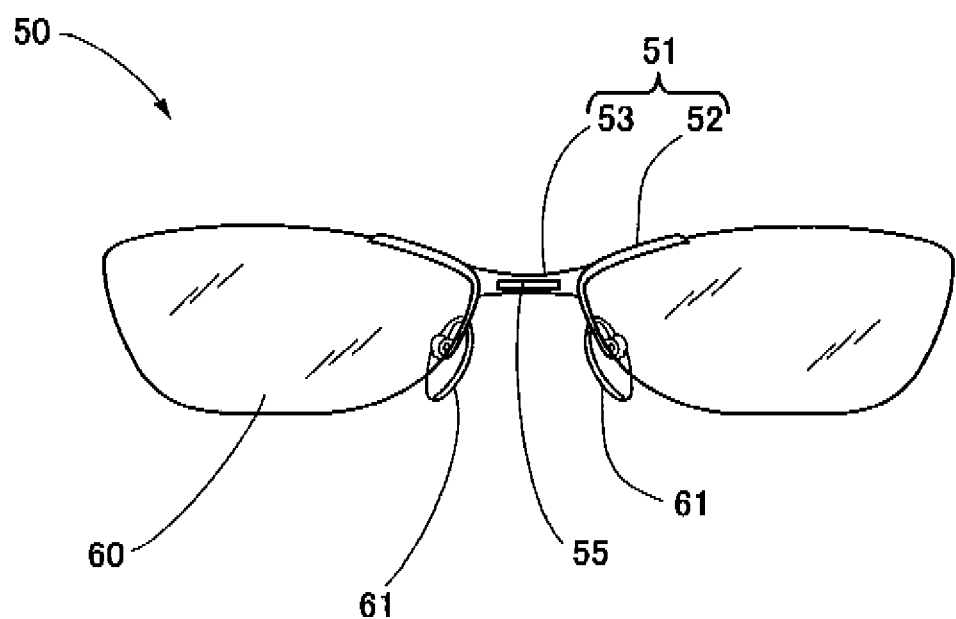
FIG. 4 is a schematic front view of an inner frame of the eyeglass frame shown in FIG. 1.

As shown in FIG. 4, the inner front frame 51 of the inner frame 50 is made, for example, of a metal. In this embodiment, the inner front frame 51 is a half rim type, but may be a full rim type. Here, the full rim type is a type in which a rim extends around the entirety of a corresponding one of the eyeglass lens to hold the corresponding one of the eyeglass lenses, and the half rim type is a type in which a half rim holds a part of the corresponding one of the eyeglass lenses and a nylon string or the like holds another part of the corresponding one of the eyeglass lenses.

Each of the inner rims 52 of the inner front frame 51 as illustrated is formed to be shorter than a normal half rim type and is composed of only a portion close to a user's nose. That is, a length of each of the inner rims 52 is substantially ¼ of an outer circumference of the eyeglass lens 60. The inner front frame 51 formed in this way is easy to manufacture and is, in particular, effective if the eyeglass lenses 60 have a large curvature, because a portion adjusting a shape between the inner front frame 51 and a corresponding one of the eyeglass lenses 60 is small.

Figure 5:
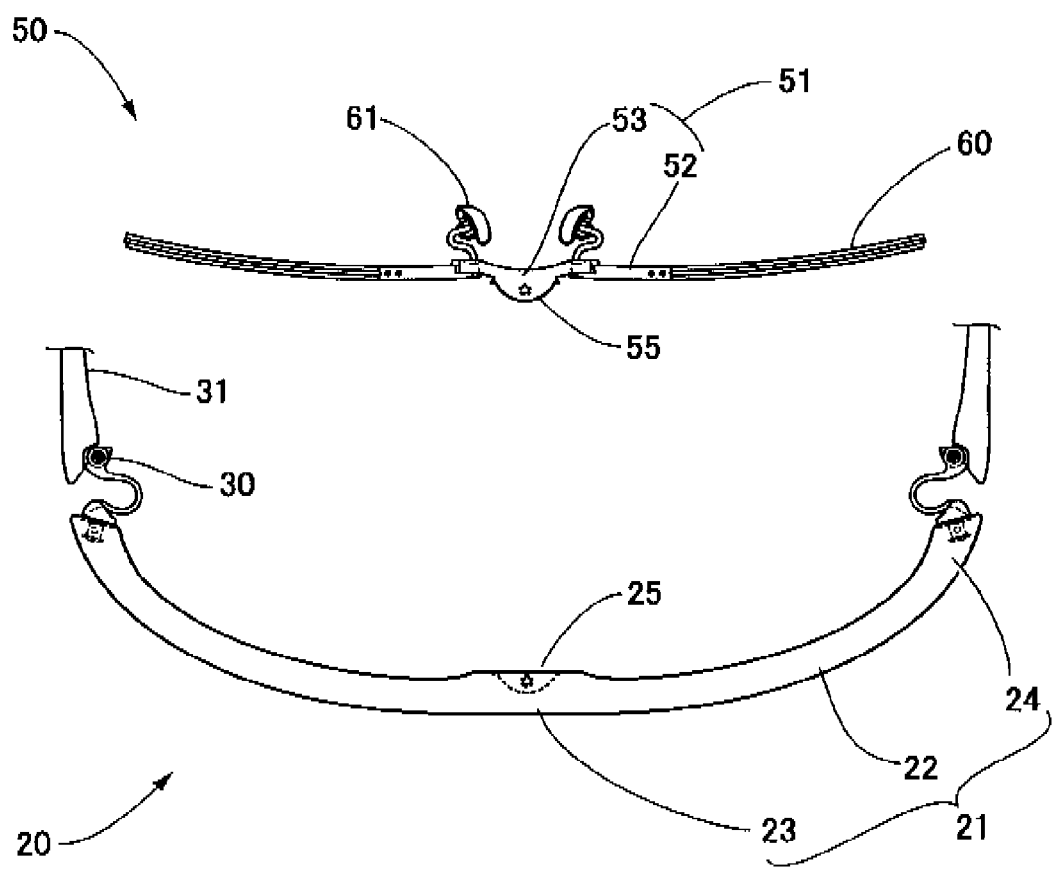
FIG. 5 is a schematic front view of the eyeglass frame shown in FIG. 1, with the inner frame being separated from an outer frame.
Figure 6:
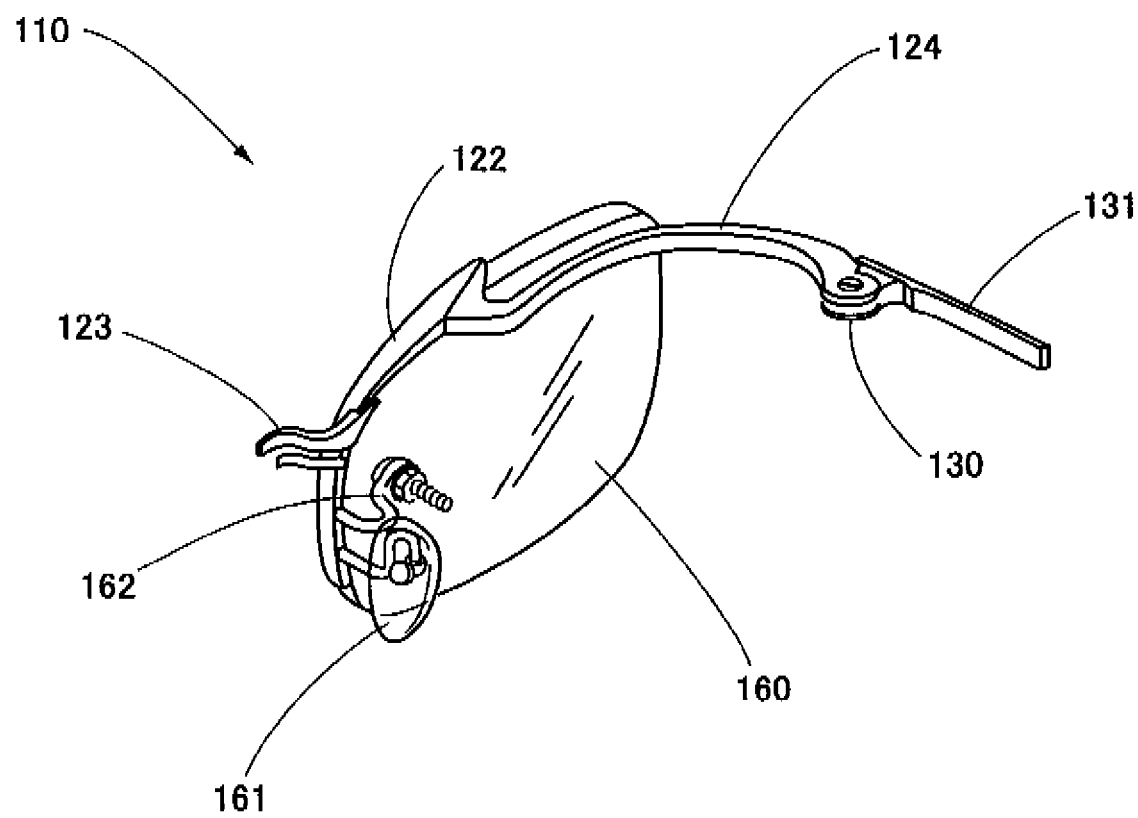
FIG. 6 is a schematic perspective view showing one example of a conventional eyeglass frame.

FIG. 5 illustrates a state where the inner frame 50 is separated from the outer frame 20, and FIG. 1 illustrates a state where the inner frame 50 is connected to the outer frame 20 by a fixing mechanism. The fixing mechanism includes a concave portion 25 provided in an inner side surface or back surface (surface facing a front surface of the inner frame 50) of the outer bridge 23 of the outer frame 20 and a convex portion 55 provided on an outer side surface or front surface (surface facing a back surface of the outer frame 20) of the inner bridge 53 of the inner frame 50 and inserted in the concave portion 25. A screw-inserting hole is provided in an upper surface of the outer frame 20, and a threaded hole is provided in the inner frame 50 to correspond to the screw-inserting hole. The inner frame 50 and the outer frame 20 are fixed by inserting the convex portion 55 in the concave portion 25, inserting a screw in the screw-inserting hole, and threading the screw into the threaded hole. As other fixing methods, the convex portion 55 and the concave portion 25 are fixed by inserting the convex portion 55 in the concave portion 25, after applying a suitable adhesive upon the convex portion 55 before inserting the convex portion 55 in the concave portion 25, or inserting the convex portion 55 in the concave portion 25 after previously filling the concave portion 25 with a suitable adhesive. As mentioned above, in case of fixing by the screw, it is possible to simplify the exchange of the eyeglass lenses 60 because the inner frame 50 is removed from the outer frame 20 by removing the screw. In addition, it is possible to exchange an inner frame of another design.

The eyeglass frame 10 in this embodiment has a structure in which the outer bridge 23 of the outer frame 20 and the inner bridge 53 of the inner frame 50 are connected. The temples 31 are connected to outer frame 20 and the eyeglass lenses 60 are attached to the inner frame 50. Therefore, even if the temples are opened widely, a force generated by the temples is not transmitted to the outer frame 20 and the inner frame 50. In addition, the provision of the elastic part 32 disposed adjacent to each hinge 30 makes it possible to further reduce such an influence on the eyeglass lenses.

In addition, the outer front frame 21 can be formed in the full rim type, or the half rim type, and the inner front frame 51 also can be formed in the full rim type, or the half rim type. The temples 31 can be made of a resin or metal. Consequently, a design having wide variation is provided.

Meanwhile, in the eyeglass frame 10, an example in which the nose pads 61 are attached to the inner front frame 51 is shown. However, the nose pads may be attached to the outer front frame 21. In each of the elastic parts 32, a portion thereof adjacent to the connection arm has the U-character like shape, but a portion thereof adjacent to the temple may also be formed in a U-character like shape, or a part of the connection arm 24, or a part of the temple 31 can also be formed in a U-character like shape.

With the foregoing structure, it is possible to provide an eyeglass frame which has a function in which even if temples are opened widely, a force generated thereby is not imparted to a front frame or eyeglass lenses, and a new design applicable to any type of eyeglasses.

Although the preferred embodiments of the present invention have been described, it should be understood that the present invention is not limited to these embodiments, and various modifications and changes can be made to the embodiments by those skilled in the art as long as such modifications and changes are within the scope of the present invention as defined by the claims.

What is claimed is:

1. An eyeglass frame, comprising:
   an outer frame;
   an inner frame disposed at an inner side of the outer frame and attached to the outer frame;
   temples, each being attached to the outer frame and configured to rotate between an inwardly folded position and an outwardly opened position, relative to the outer frame; and
   a right eyeglass lens and a left eyeglass lens, each being attached to the inner frame;
   wherein the outer frame includes a right opening portion and a left opening portion disposed in such a manner to correspond to the right eyeglass lens and the left eyeglass lens, respectively, and
   wherein the right opening portion defines a gap between a right end of the outer frame and the right eyeglass lens, and the left opening portion defines a gap between a left end of the outer frame and the left eyeglass lens.

2. The eyeglass frame according to claim 1,
   wherein the outer frame includes an outer front frame,
   wherein the outer front frame has a right outer rim and a left outer rim surrounding the right opening portion and the left opening portion, respectively, an outer bridge connecting the right outer rim and the left outer rim, and a connection arm extending from an end of each of the right outer rim and the left outer rim and being connected to a corresponding one of the temples,
   wherein the inner frame includes an inner front frame,
   wherein the inner front frame has a right inner rim and a left inner rim holding the right eyeglass lens and the left eyeglass lens, respectively, and an inner bridge connecting the right inner rim and the left inner rim, and
   wherein the inner bridge is attached to the outer front frame.

3. The eyeglass frame according to claim 2,
   wherein the inner front frame is attached to the outer front frame by a fixing mechanism.

4. The eyeglass frame according to claim 3,
   wherein the fixing mechanism includes a concave portion disposed in an inner side surface of the outer bridge of the outer front frame, and a convex portion disposed on an outer side surface of the inner bridge of the inner front frame and inserted in the concave portion.

5. The eyeglass frame according to claim 2,
   wherein the outer front frame is made of a resin.

6. The eyeglass frame according to claim 2,
   wherein the inner front frame is made of a metal.

7. The eyeglass frame according to claim 2,
   wherein each of the connection arms of the outer front frame is connected to the corresponding one of the temples through a hinge.

8. The eyeglass frame according to claim 7,
   wherein each of the connection arms and the corresponding one of the temples in the outer front frame are connected through an elastic part in addition to the hinge.

9. The eyeglass frame according to claim 2,
   wherein the outer front frame is a full rim type and the inner front frame is a half rim type.

10. The eyeglass frame according to claim 2,
    further comprising nose pads disposed on the inner front frame.

11. The eyeglass frame according to claim 1,
    wherein the outer frame includes an outer front frame having a right outer rim and a left outer rim surrounding the right opening portion and the left opening portion, respectively, and
    wherein a curvature of the right outer rim is greater than a curvature of the right eyeglass lens, and a curvature of the left outer rim is greater than a curvature of the left eyeglass lens.

12. The eyeglass frame according to claim 1,
    wherein a part of the right eyeglass lens is disposed outside the right opening portion, and a part of the left eyeglass lens is disposed outside the left opening portion.

13. The eyeglass frame according to claim 1,
    wherein the inner front frame has a right inner rim and a left inner rim, and
    wherein the right inner rim adjoins only a portion of a perimeter of the right eyeglass lens and the left inner rim adjoins only a portion of a perimeter of the left eyeglass lens.

* * * * *